United States Patent
Ishida et al.

(10) Patent No.: US 12,397,925 B2
(45) Date of Patent: Aug. 26, 2025

(54) MONITORING SYSTEM FOR MEASURING PHYSICAL QUANTITIES AT MEASUREMENT POINTS OF STRUCTURAL BODY, AIRCRAFT, AND MONITORING METHOD

(71) Applicants: KAWASAKI JUKOGYO KABUSHIKI KAISHA, Kobe (JP); The University of Tokyo, Tokyo (JP)

(72) Inventors: Takuya Ishida, Kobe (JP); Hiroshi Mamizu, Kobe (JP); Yuji Ikeda, Kobe (JP); Shu Minakuchi, Tokyo (JP)

(73) Assignees: KAWASAKI JUKOGYO KABUSHIKI KAISHA, Kobe (JP); THE UNIVERSITY OF TOKYO, Tokyo (JP)

( * ) Notice: Subject to any disclaimer, the term of this patent is extended or adjusted under 35 U.S.C. 154(b) by 0 days.

(21) Appl. No.: 18/096,578

(22) Filed: Jan. 13, 2023

(65) Prior Publication Data

US 2023/0144658 A1    May 11, 2023

Related U.S. Application Data

(63) Continuation of application No. PCT/JP2021/026320, filed on Jul. 13, 2021.

(Continued)

(51) Int. Cl.
*B64D 45/00* (2006.01)
*B64F 5/60* (2017.01)
*G01M 5/00* (2006.01)

(52) U.S. Cl.
CPC .......... *B64D 45/00* (2013.01); *B64F 5/60* (2017.01); *G01M 5/0033* (2013.01); *G01M 5/0041* (2013.01); *B64D 2045/0085* (2013.01)

(58) Field of Classification Search
CPC ... B64D 45/00; B64D 2045/0085; B64F 5/60; G01M 5/0033; G01M 5/0041; G06Q 10/20; G07C 5/006
See application file for complete search history.

(56) References Cited

U.S. PATENT DOCUMENTS 7,469,595 B2 * 12/2008 Kessler ............... H10N 30/302
                                                      73/583
8,706,447 B2 *  4/2014 Iannone ............. G01M 5/0041
                                                     702/183

(Continued)

FOREIGN PATENT DOCUMENTS

CN      102183350 A      9/2011
JP      2008-505004 A    2/2008

(Continued)

OTHER PUBLICATIONS

Predictive airframe maintenance strategies using model-based prognostics; Wang et al. Proceedings of the Institution of Mechanical Engineers, Part O: Journal of Risk and Reliabilityvol. 232, Issue 6, Dec. 2018, pp. 690-709 © IMechE 2018, (Year: 2018).*

(Continued)

*Primary Examiner* — Huy Q Phan
*Assistant Examiner* — Martin Walter Braunlich
(74) *Attorney, Agent, or Firm* — XSENSUS LLP

(57) ABSTRACT

A monitoring system according to one aspect of the present disclosure includes: a sensor to measure physical quantities at one or a plurality of measurement points of a structural body; processing circuitry configured to acquire measured values from the measurer; a memory to store the measured values acquired from the measurer; and a data storage that, when one or some of the measured values stored in the memory satisfy a predetermined trigger condition, and as a result, it is determined that the structural body has received impact, records a group of data of the measured values (Continued)

which are within a certain time range and include the measured value based on which it is determined that the trigger condition is satisfied.

16 Claims, 3 Drawing Sheets

Related U.S. Application Data

(60) Provisional application No. 63/052,138, filed on Jul. 15, 2020.

(56) References Cited

U.S. PATENT DOCUMENTS

| | | | |
|---|---|---|---|
| 8,880,242 B2* | 11/2014 | Hinnant, Jr. | G07C 5/0841 |
| | | | 701/34.2 |
| 9,792,253 B2* | 10/2017 | Ohmae | G01D 21/00 |
| 10,302,524 B2* | 5/2019 | Chang | G01N 3/02 |
| 11,084,601 B2* | 8/2021 | Abe | B64D 45/00 |
| 11,455,848 B2* | 9/2022 | Dunning | B64F 5/60 |
| 11,618,591 B2* | 4/2023 | Goertz | G01B 9/02098 |
| | | | 374/57 |
| 2006/0004499 A1 | 1/2006 | Trego et al. | |
| 2010/0168935 A1 | 7/2010 | Rashid et al. | |
| 2020/0239162 A1* | 7/2020 | Saito | G01M 5/0033 |

FOREIGN PATENT DOCUMENTS

| | | |
|---|---|---|
| JP | 2012-513933 A | 6/2012 |
| KR | 101586039 B1 | 2/2016 |

OTHER PUBLICATIONS

Supplementary European Search Report mailed May 22, 2024, in European Application No. 21841976.0, 12 pages.

* cited by examiner

MONITORING SYSTEM FOR MEASURING PHYSICAL QUANTITIES AT MEASUREMENT POINTS OF STRUCTURAL BODY, AIRCRAFT, AND MONITORING METHOD

CROSS-REFERENCE TO RELATED APPLICATIONS

The present application is a bypass continuation of PCT Filing PCT/JP2021/026320, filed Jul. 13, 2021, which claims priority to U.S. 63/052,138, filed Jul. 15, 2020, both of which are incorporated by reference in their entirety.

BACKGROUND ART

The present disclosure relates to a monitoring system, an aircraft, and a monitoring method.

In the field of aircrafts, a structural health monitoring (SHM) system has been devised. The structural health monitoring (SHM) system accumulates measured values acquired from sensors located at an airframe and recognizes the state of the airframe based on the accumulated measured values.

SUMMARY

A monitoring system according to one aspect of the present disclosure includes: a sensor to measure physical quantities at one or a plurality of measurement points of a structural body; processing circuitry configured to acquire measured values from the sensor; a memory to store the measured values acquired from the sensor; and a data storage that, when one or some of the measured values stored in the memory satisfy a predetermined trigger condition, and as a result, it is determined that the structural body has received impact, records a group of data of the measured values which are within a certain time range and include the measured value based on which it is determined that the trigger condition is satisfied.

Moreover, the present disclosure discloses a method of monitoring a structural body, the method including: measuring physical quantities at one or a plurality of measurement points of a structural body; acquiring the physical quantities as measured values that are time-series data of a predetermined sampling cycle; temporarily holding the measured values; and when one or some of the temporarily held measured values satisfy a predetermined trigger condition, determining that the structural body has received impact and recording a group of data of the measured values which are within a certain time range and include the measured value based on which it is determined that the trigger condition is satisfied.

DESCRIPTION OF THE PREFERRED EMBODIMENTS

Entire Configuration

Hereinafter, a monitoring system 100 according to an embodiment will be described. First, the entire configuration of the monitoring system 100 will be described.

The monitoring system 100 according to the present embodiment is a system that recognizes the state of a structural body 101. The state of the structural body 101 in the present embodiment mainly denotes the occurrence of impact at the structural body 101 during the operation of the structural body 101 or the history of load at the structural body 101 during the operation of the structural body 101. More specifically, the state of the structural body 101 in the present embodiment denotes the frequency or position of the occurrence of impact or repeated load that is a cause of fatigue damage, the degree of damage by impact, or the like. However, the present embodiment is not limited to this. Moreover, the structural body 101 whose state is a target to be recognized by the monitoring system 100 according to the present embodiment is an airframe of an aircraft which is made of a composite material. However, the structural body 101 is not limited to the airframe of the aircraft, and may be a hull, a pipe, a building, or the like. Furthermore, the material of the structural body 101 is not especially limited.

Figure 1:
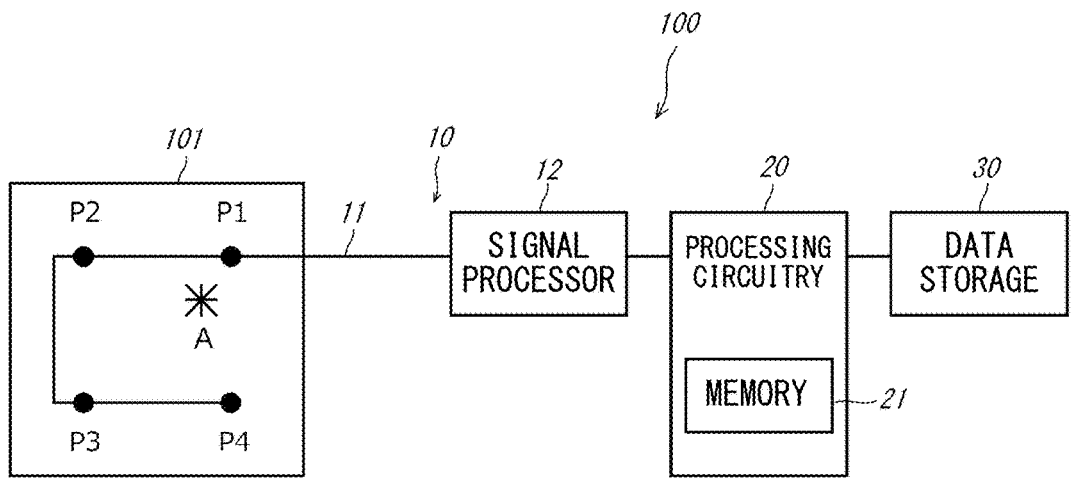
FIG. 1 is a block diagram of a monitoring system.

FIG. 1 is a block diagram of the monitoring system 100 according to the present embodiment. As shown in FIG. 1, the monitoring system 100 according to the present embodiment includes a measurer 10, processing circuitry 20, a memory 21, and a data storage 30. The measurer 10, the processing circuitry 20, the memory 21, and the data storage 30 are mounted on the airframe that is the structural body 101. The following will describe these components in order.

The measurer 10 is a device that measures physical quantities at measurement points P1 to P4 of the structural body 101. The measurer 10 of the present embodiment measures strains at the measurement points P1 to P4 of the structural body 101. The present embodiment describes a case where the number of measurement points is four. However, the number of measurement points is not limited to four. The measurer 10 includes an optical fiber sensor 11 and a signal processor 12. The optical fiber sensor 11 is embedded in the structural body 101 and passes through the measurement points P1 to P4. The signal processor 12 converts a signal, transmitted from the optical fiber sensor 11, into the strain. The measurer 10 of the present embodiment measures the strain by using the optical fiber sensor 11. However, the measurer 10 of the present embodiment may measure the strain by using another sensor, such as a strain gauge. The type of the sensor may be suitably changed in accordance with the type of the physical quantity to be measured. Plural types of sensors may be used in combination. One example of the type of the sensor to be used is a temperature sensor.

The processing circuitry 20 is a device that acquires measured values from the measurer 10 and performs various calculation processing. In the present embodiment, the processing circuitry 20 is integrated with the memory 21. However, the processing circuitry 20 and the memory 21 do not have to be integrated with each other and may be separated from each other. The processing circuitry 20 includes a processor, a volatile memory, a non-volatile memory, an I/O interface, and the like. The memory 21 temporarily memorizes the measured values acquired from the measurer 10. In other words, the memory 21 temporarily stores the measured values acquired from the measurer 10. Moreover, the non-volatile memory of the processing circuitry 20 preserves various programs and various data, and the processor of the processing circuitry 20 performs the calculation processing based on various programs by using the volatile memory. The calculation processing performed by the processing circuitry 20 includes data acquisition processing and data conversion processing. These processing will be described later.

The data storage 30 is a device that finally preserves various data processed by the processing circuitry 20. Moreover, the data storage 30 is connectable to external equipment, and the data preserved in the data storage 30 can be taken out to the external equipment. As will be described later, the memory 21 of the present embodiment is memory equipment that temporarily stores data for a trigger condition determination of the processing circuitry 20 and data for various data processing of the processing circuitry 20. The data storage 30 is memory equipment that finally preserves data after the execution of the trigger condition determination and data after the execution of various data processing. The data storage 30 may be integrated with the processing circuitry 20.

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

Data Acquisition Processing

Next, data acquisition processing performed by the processing circuitry 20 will be described. Data acquisition processing is processing in which the processing circuitry 20 acquires the measured value from the measurer 10 in a predetermined sampling cycle. This predetermined sampling cycle is hereinafter referred to as a "first sampling cycle". The first sampling cycle of the present embodiment is, for example, 1.25 to 80 µs. The first sampling cycle of the present embodiment is also represented by, for example, 12.5 to 800 kHz in a sampling rate. However, the first sampling cycle is not limited to this. Moreover, in the data acquisition processing according to the present embodiment, the processing circuitry 20 acquires the measured values from the measurer 10 in the first sampling cycle and stores the measured values in the memory 21 as time-series data that is data of a certain period of time, for example, 10 seconds. Hereinafter, this time-series data, which is measured in the first sampling cycle and stored in the memory 21 in a certain period of time, is referred to as "high-rate time-series data". As will be described later, in the present embodiment, after the high-rate time-series data is stored in the memory 21 by the data acquisition processing, the high-rate time-series data is further processed in some cases and is, for example, preserved in the data storage 30. Then, the high-rate time-series data is deleted from the memory 21. After that, the next high-rate time-series data is stored in the memory 21. As above, processing in which the high-rate time-series data is sequentially stored in the memory 21 and deleted from the memory 21 is repeated. The above-described certain period of time is not limited to 10 seconds.

Storing the high-rate time-series data in the memory 21 may be performed by various methods as long as the time series of the data is not damaged in the above-described repetition. Examples of such methods include: a method in which data such as data sampled in the above-described first sampling cycle, the amount of which is smaller than the amount of data that can be stored in the memory 21, is successively stored in the memory 21, and data the amount of which is equal to the amount of data stored as above is successively deleted in the ascending order of time; and a method in which sampling data acquired in the first sampling cycle is temporarily stored in memory equipment, a volatile memory, or a non-volatile memory in the processing circuitry 20 other than the memory 21 until the amount of sampling data stored becomes equal to the capacity of the memory 21, the group of stored data is collectively stored in the memory 21, and the group of data stored in the memory 21 is collectively deleted as one package. In either method, the amount of data stored in the memory 21 and the amount of data deleted from the memory 21 at a certain timing are equal to each other, and the time-series relation in the group of data stored in the memory 21 is secured. Moreover, the total amount of data stored in the memory 21 is constant at any timing. The latter method requires, in addition to the memory 21, memory equipment, a volatile memory, or a non-volatile memory which temporarily preserves the group of time-series data sampled in the first sampling cycle and packages the group of time-series data.

Data Conversion Processing

Next, the data conversion processing performed by the processing circuitry 20 will be described. The data conversion processing is performed in parallel with the above-described data acquisition processing.

Figure 2:
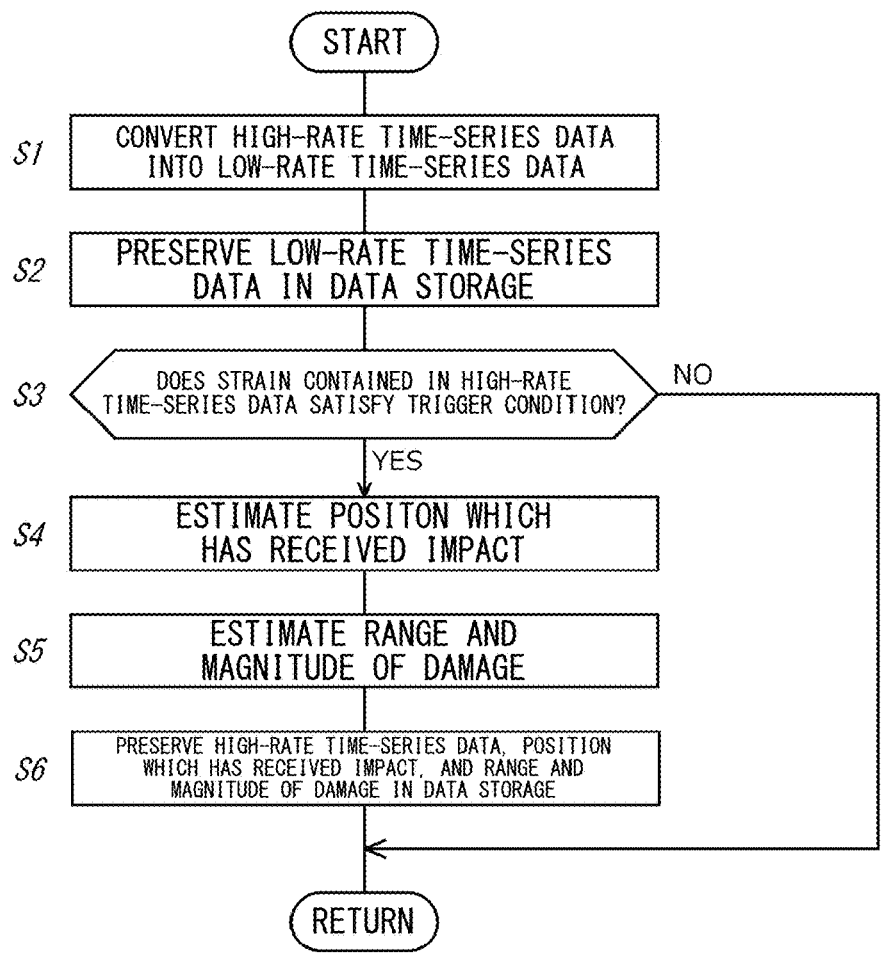
FIG. 2 is a flowchart of data conversion processing.

FIG. 2 is a flowchart of the data conversion processing. In the present embodiment, when the data conversion processing starts, the processing circuitry 20 converts the high-rate time-series data stored in the memory 21 into time-series data whose sampling cycle is longer than the first sampling cycle (Step S1). This time-series data whose sampling cycle is longer than the first sampling cycle is hereinafter referred to as "low-rate time-series data". This sampling cycle longer than the first sampling cycle is hereinafter referred to as a "second sampling cycle". The second sampling cycle is, for example, 0.0005 to 10 seconds. The second sampling cycle is also represented by, for example, 0.1 to 2,000 Hz in a sampling rate. In the present embodiment, the low-rate time-series data is generated by partially eliminating data from the high-rate time-series data stored in the memory 21. However, the low-rate time-series data may be generated by methods other than the above method. For example, the high-rate time-series data may be subjected to average processing to be converted into the low-rate time-series data. Low-pass filter processing may be performed. Without using the high-rate time-series data, time-series data acquired in the second sampling cycle directly from the measurer 10 through another system may be accumulated as the low-rate time-series data. Or, another method may be such that: memory equipment, a volatile memory, or a non-volatile memory whose memory capacity is larger than that of the memory 21 is additionally prepared; the high-rate time-series data or the group of sampling data acquired in the first sampling cycle directly from the measurer 10 is stored; and the group of data stored at predetermined intervals is collectively converted into the low-rate time-series data.

Next, the processing circuitry 20 memorizes the low-rate time-series data in the data storage 30 (Step S2). Since the second sampling cycle is longer than the first sampling cycle as described above, the low-rate time-series data is smaller in amount than the high-rate time-series data in the same period of time. Therefore, the low-rate time-series data can be chronologically accumulated in the data storage 30 during the operation of the structural body 101. In the present embodiment, through the above processing, the low-rate time-series data of the strain in the structural body 101 which is the measured values can be accumulated, i.e., the history of the load input to the structural body 101 can be accumulated. The operation history and load history of the airframe that is the structural body 101 can be recognized by using this data, and for example, fatigue accumulation states of respective portions can be recognized from these histories. By constructing in advance a correlation between the load applied to the structural body 101 and the strain generated at each portion of the structural body 101, the load generated in the structural body 101 can be obtained from the acquired strain. Moreover, the strain generated in the structural body 101 is influenced by the temperature of the structural body 101 when the strain is generated. Therefore, by using a numerical value of the strain which is corrected by using the temperature when calculating the load generated in the structural body 101, the generated load can be obtained with a higher degree of accuracy. As above, the load history according to the present disclosure includes not only the time-series data of the strain but also various time-series data, such as the time-series data of the temperature of the structural body 101, which is necessary to calculate the generated load. The time-series data of the temperature is also called a temperature history.

Next, the processing circuitry 20 determines whether or not the strain contained in the high-rate time-series data satisfies a predetermined trigger condition (Step S3). The trigger condition according to the present embodiment is set such that when the structural body 101 receives impact, the strain satisfies the trigger condition. Specifically, when the strain contained in the high-rate time-series data exceeds a preset upper limit threshold or falls below a preset lower limit threshold, the processing circuitry 20 determines that the trigger condition is satisfied. The upper limit threshold and the lower limit threshold may be fixed values. However, the upper limit threshold and the lower limit threshold according to the present embodiment are variable values. Specifically, the upper limit threshold and lower limit threshold of the strain as a determination target are based on the strain that is acquired a predetermined period of time before a time point at which the strain as the determination target is acquired.

Figure 3:
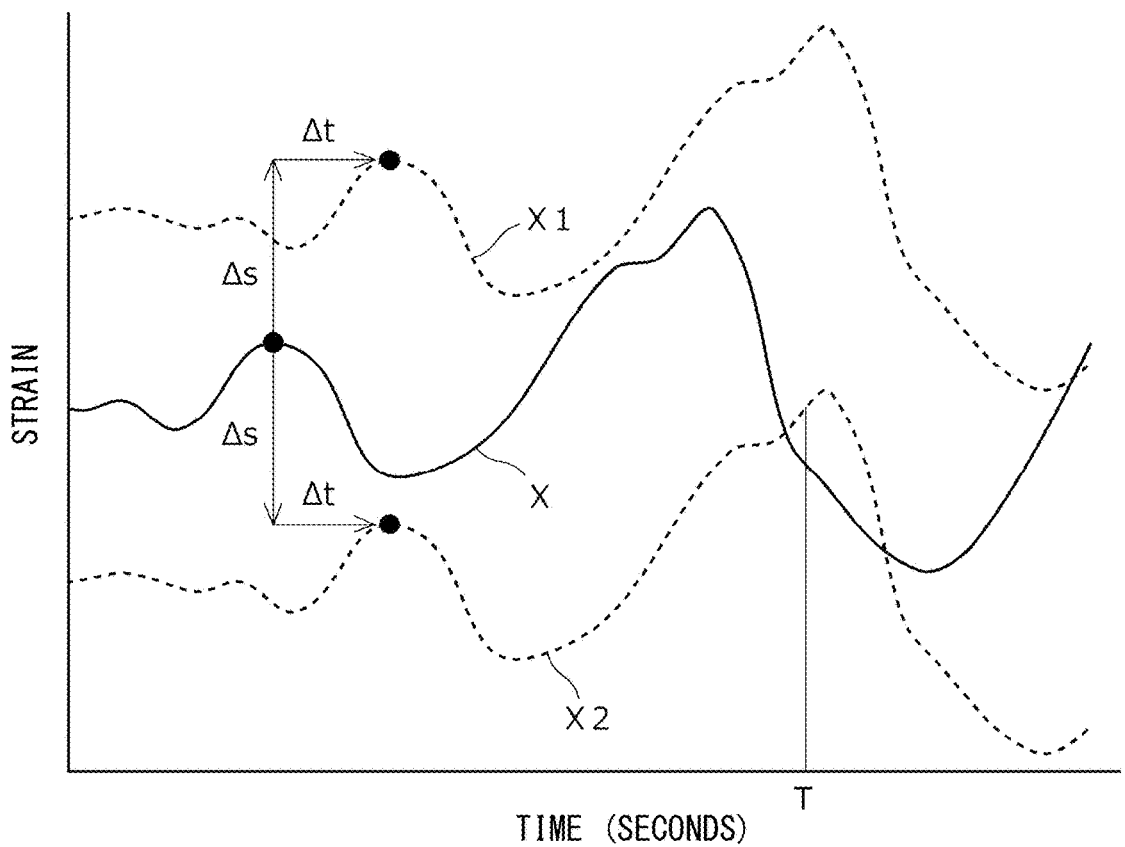
FIG. 3 is a diagram for explaining an upper limit threshold and a lower limit threshold.

FIG. 3 is a diagram for explaining the upper limit threshold and the lower limit threshold in the present embodiment. In FIG. 3, a waveform X represents a time change of the strain at a certain measurement point, such as the measurement point P1, which is acquired by the processing circuitry 20. In other words, the waveform X represents time-series data of the strain at a certain measurement point which is acquired by the processing circuitry 20. In FIG. 3, a horizontal axis represents a time, i.e., a time point at which the strain is acquired, and a vertical axis represents the strain. Moreover, a waveform X1 represents the upper limit threshold, and a waveform X2 represents the lower limit threshold. In FIG. 3, the waveform X1 is obtained by: moving the waveform X toward a larger value by a predetermined amount $\Delta s$; and delaying the waveform X by a predetermined time $\Delta t$. This explanation is indicated by black spots in FIG. 3. Moreover, the waveform X2 is obtained by: moving the waveform X toward a smaller value by the predetermined amount $\Delta s$; and delaying the waveform X by the predetermined time $\Delta t$.

In FIG. 3, when the waveform X is located above the waveform X1, it is determined that the strain exceeds the upper limit threshold. When the waveform X is located under the waveform X2, it is determined that the strain falls below the lower limit threshold. For example, at a time point T in FIG. 3, the strain falls below the lower limit threshold, and therefore, the processing circuitry 20 determines that the strain acquired at the time point T satisfies the trigger condition. As above, in the present embodiment, the upper limit threshold and the lower limit threshold are based on the measured value acquired the predetermined time $\Delta t$ before the time point at which the measured value as the determination target is acquired. Therefore, in the determination regarding whether or not the acquired strain satisfies the trigger condition, the strain generated by the normal operation of the structural body 101 and the strain generated by the impact can be distinguished from each other. For example, when the structural body 101 is an aircraft, the structural body 101 may be partially bent due to turning maneuver or the like, and this may generate the strain. When the upper limit threshold and the lower limit threshold are fixed values, the determination is performed for the impact applied to the structure that has already been bent due to the turning maneuver. In this case, a steady-state value of the strain deviates toward the upper limit threshold or the lower limit threshold from the value in a case where the turning maneuver is not performed. Therefore, the impact cannot be detected accurately. In the present embodiment, a zero point of the strain in a steady operation is corrected, and with this, the impact can be detected accurately.

In the present embodiment, when at least one of the strains at the plurality of measurement points exceeds the upper limit threshold or falls below the lower limit threshold, it is determined that the trigger condition is satisfied. However, only when the strains at the measurement points exceed the upper limit threshold or fall below the lower limit threshold, it may be determined that the trigger condition is satisfied. Moreover, in the present embodiment, when at least one of the strains at the time points exceeds the upper limit threshold or falls below the lower limit threshold, it is determined that the trigger condition is satisfied. However, only when the strains at the time points exceed the upper limit threshold or fall below the lower limit threshold, it may be determined that the trigger condition is satisfied.

Referring back to FIG. 2, when the processing circuitry 20 determines in Step S3 that the strain does not satisfy the trigger condition (No in Step S3), the processing circuitry 20 returns to Step S1. The group of data of the strain which is the high-rate time-series data stored in the memory 21 may be sequentially deleted in the ascending order of acquisition timing or may be deleted when it is determined that the strain does not satisfy the trigger condition. As above, since the data is deleted periodically, the capacity of the memory 21 can be suppressed. Especially in the latter case, the high-rate time-series data temporarily stored in the memory 21 is deleted at an appropriate timing, and thus, the data finally preserved in the data storage is selected. With this, the amount of data of the measured values accumulated in the data storage can be suppressed.

On the other hand, when the processing circuitry 20 determines in Step S3 that the strain satisfies the trigger condition (Yes in Step S3), it is thought that the structural body 101 has received impact. Therefore, the processing circuitry 20 estimates the position of a portion of the structural body 101 which has received the impact (Step S4). The time changes of the strains at the measurement points P1 to P4 differ depending on a distance from the position of the portion of the structural body 101 which has received the impact. For example, in FIG. 1, when a position A of the structural body 101 has received the impact, the impact is propagated in the structural body 101 at a certain speed specific to the material and structure shape of the structural body 101. Therefore, the strain at the measurement point P1 closest to the position A among the measurement points P1 to P4 reaches the peak at an earliest timing, and the strain at the measurement point P3 furthest from the position A among the measurement points P1 to P4 reaches the peak at a latest timing. The position of the portion of the structural body 101 which has received the impact can be estimated based on an impact propagation speed in the material of the structural body 101 and the differences of the time changes of the strains at the measurement points P1 to P4.

The method of estimating the position of the portion of the structural body 101 which has received the impact is not limited to the above method. For example, it is thought that the strain at the measurement point P1 closest to the position A among the measurement points P1 to P4 is the largest, and the strain at the measurement point P3 furthest from the position A among the measurement points P1 to P4 is the smallest. Therefore, the position of the portion of the structural body 101 which has received the impact may be estimated based on the differences of the strains at the measurement points P1 to P4. Moreover, the position of the portion of the structural body 101 which has received the impact may be estimated in such a manner that: the impact is applied to various portions of the structural body 101 in advance; and by using experimental data obtained by measuring the strains generated at the measurement points P1 to P4 by the above application of the impact, a correlation between the position where the impact is applied and the strain at each measurement point is derived by machine learning or the like.

Figure 4:
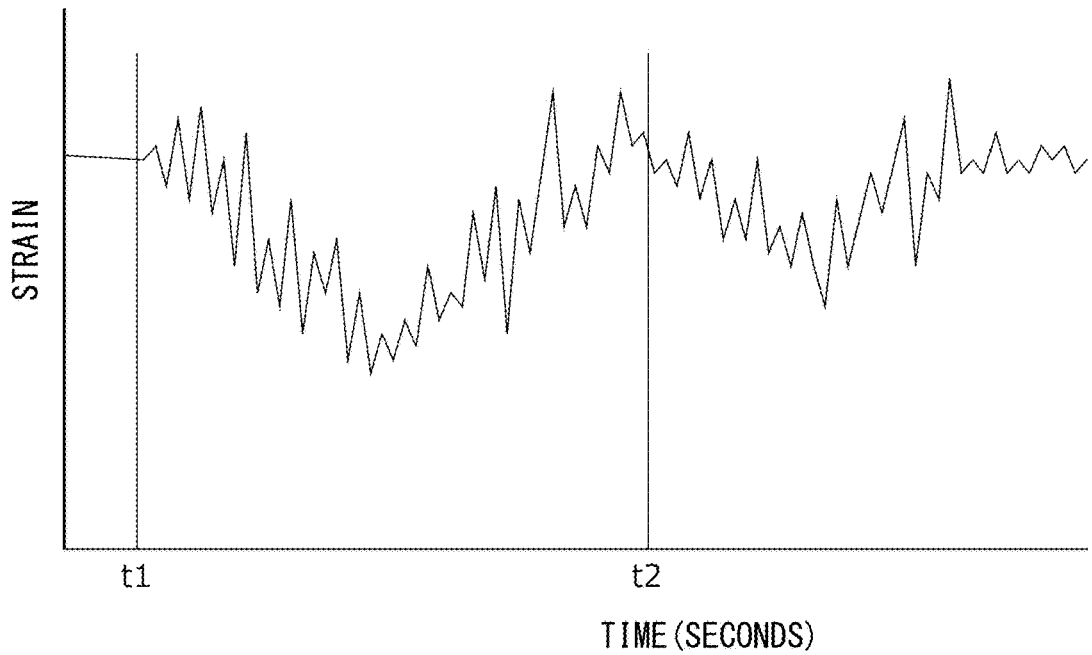
FIG. 4 is a diagram showing a waveform of a time change of a strain.
Figure 5:
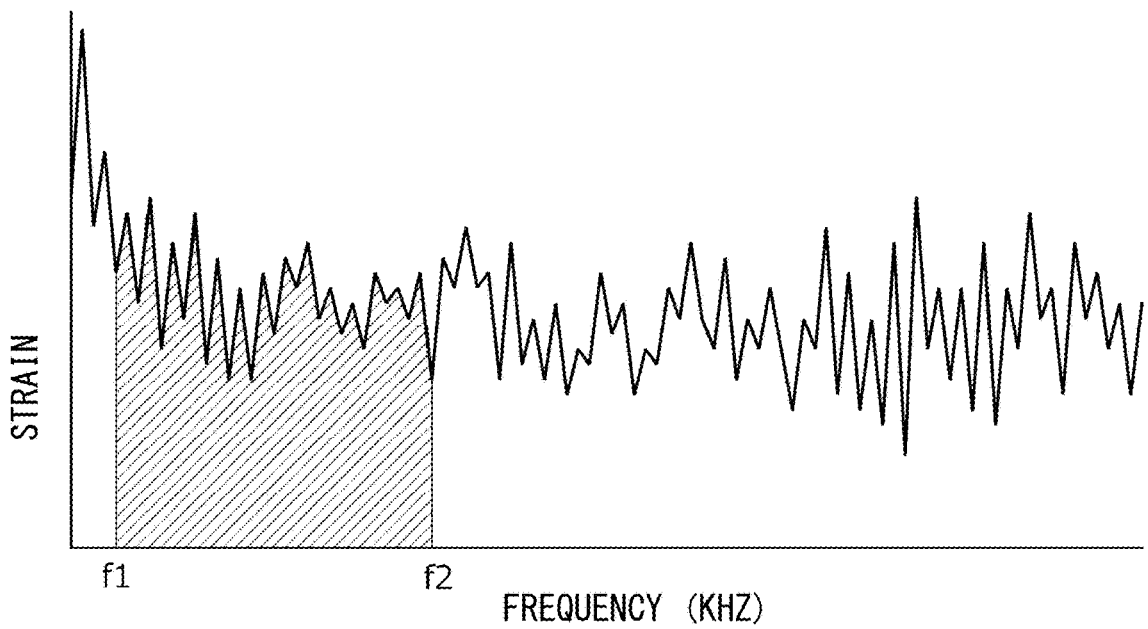
FIG. 5 is a diagram showing a result of a Fourier transform of the waveform shown in FIG. 4.

Next, the processing circuitry 20 estimates the range and magnitude of the damage generated by the impact applied to the structural body 101 (Step S5). FIG. 4 is a diagram showing a waveform of the time change of the strain at a certain measurement point, for example, the measurement point P1, when the structural body 101 has received the impact. That is, FIG. 4 corresponds to the waveform X of FIG. 3. When this waveform is subjected to a Fourier transform in a predetermined time range, for example, in a range from a time point t1 to a time point t2, the waveform is converted into a frequency response spectrum, as represented by, for example, a power spectral density shown in FIG. 5. Then, by integrating a predetermined frequency range, such as a range from a frequency f1 to a frequency f2, in this frequency waveform, an integrated value of frequency response can be obtained.

The above range of the damage denotes, for example, the range of damage generated in an in-plane direction of a flat plate structure when impact is perpendicularly input to the flat plate structure, and the above magnitude of the damage denotes the depth of damage generated in an out-of-plane direction of the flat plate structure, i.e., in a thickness direction of the flat plate structure. Since the impact input to the structural body is propagated three-dimensionally from an input spot, the damage may also be generated and distributed along such propagation range. However, for example, a structure made of fiber reinforced laminated plastic produced by laminating prepregs made of resin and fibers may cause damage in which delamination spreading in the direction of the range of the damage inside the structural body with respect to an input point of the impact applied to the surface of the structural body occurs at plural layers of the structural body in the direction of the magnitude of the damage. In this case, the range of a delaminated surface of each layer is defined as the range of the damage, and a depth from the structural body surface to which the impact is applied to a deepest position at which the delamination by the damage occurs is defined as the magnitude of the damage. In some cases, the position of such damage is hardly confirmed from the surface of the structural body. Moreover, the impact may be applied to structural bodies of various shapes in a direction that is not perpendicular to the structural bodies. In this case, the range and magnitude of the damage are defined based on a component of the impact which is perpendicularly input to the structural body, and the direction of the range of the damage extends along a curved shape or uneven shape of the surface of the structural body to some extent.

It was found that there is a correlation among the integrated value of the frequency response, the distance from the position of the portion of the structural body 101 which has received the impact to the measurement point, and the range and magnitude of the damage generated by the impact applied to the structural body 101. Therefore, experiments in which impact that generates various ranges and magnitudes of the damage is applied to various positions of the structural body 101 are performed in advance, and with this, such correlations can be recognized. Thus, the "integrated value of the frequency response" can be obtained from the time-series data of the strain, and the "distance from the position of the portion of the structural body 101 which has received the impact to the measurement point" can be obtained from the position of the portion of the structural body 101 which has received the impact, the position being estimated in Step S4. Therefore, the range and magnitude of the damage generated by the impact applied to the structural body 101 can be estimated based on the above correlations. The range and magnitude of the damage may be estimated in such a manner that: experiments in which impact that generates various ranges and magnitudes of the damage is applied to various positions of the structural body 101 are performed in advance by using the structural body 101; and by using the results of these experiments, machine learning of the correlation among the input direction and magnitude of the impact and the range and magnitude of the damage is performed.

Next, the processing circuitry 20 preserves the high-rate time-series data in the data storage 30 (Step S6). In the present embodiment, the high-rate time-series data is in the memory 21 of the processing circuitry 20 as described above, and therefore, this data is preserved in the data storage 30 from the memory 21. The data preserved in the data storage 30 at this time is data which is within a certain time range and includes the measured value which has been determined to satisfy the trigger condition. The "certain time range" herein is not especially limited. For example, the certain time range may be a range of one second from a time point at which the measured value which has been determined to satisfy the trigger condition is acquired or may be a range from 0.5 second before the time point at which the measured value which has been determined to satisfy the trigger condition is acquired until 0.5 second after the time point at which the measured value which has been determined to satisfy the trigger condition is acquired.

The processing circuitry 20 memorizes the high-rate time-series data in the data storage 30, and in addition, preserves in the data storage 30, information of the position, estimated in Step S4, of the portion of the structural body 101 which has received the impact and information of the range and magnitude, estimated in Step S5, of the damage generated by the impact applied to the structural body 101 (Step S6). The information of the position, estimated in Step S4, of the portion of the structural body 101 which has applied the impact is also called impact position information. The information of the range and magnitude, estimated in Step S5, of the damage generated by the impact applied to the structural body 101 is also called damage range information.

As above, in the present embodiment, in a case where it is determined that the strain contained in the high-rate time-series data satisfies the trigger condition, it is determined that the structural body 101 has received the impact. Then, the strain is preserved in the data storage 30 as short-cycle time-series data which is also called high-rate time-series data, and the information of the position, calculated by using the high-rate time-series data, at which the impact is received and the information of the range and magnitude of the damage are preserved in the data storage 30. In cases other than the above case, only the low-rate time-series data whose sampling cycle is longer than that of the high-rate time-series data is preserved in the data storage 30. Therefore, during the normal operation of the structural body 101, the low-rate time-series data whose data amount is smaller is recorded. Moreover, only when it is determined that the impact has occurred, the high-rate time-series data which is within a certain period of time and includes the data which has been determined that the impact has occurred is preserved. With this, while significantly reducing the total amount of data stored in the data storage 30, impact detection, impact position estimation, and impact damage range estimation of the structural body 101 can be realized. Moreover, when the structural body 101 is made of a composite material, the damage may not appear on the surface of the structural body 101 even if the damage occurs inside the structural body 101 by the impact. Therefore, the monitoring system derived from the present disclosure which can acquire damage occurrence timing information, damage occurrence position information, and impact damage range information can be suitably used especially when the structural body 101 is made of a composite material. As described above, in many cases, it is difficult to visually confirm from an outside whether or not there is damage in the structural body made of a composite material. Therefore, generally, the airframe is periodically inspected at regular intervals, and the soundness thereof is diagnosed. On the other hand, according to the monitoring system of the present disclosure, only when an impact determination is recorded, additional inspection is performed by nondestructive inspection or the like. Therefore, man-hours for the inspection can be reduced. Moreover, according to the monitoring system of the present disclosure, since the occurrence of the impact can be detected without a report from a crew or a mechanic, the safety can be further improved. Furthermore, when the range or magnitude of the damage caused by the impact falls below a preset value, it is determined that the damage is slight, and therefore, the additional inspection is omitted. In addition, depending on the position of the damage caused by the impact, a portion that requires the additional inspection can be narrowed. Therefore, the man-hours for the inspection can be further reduced, and the availability of the structural body itself can be improved.

After Step S6, the processing circuitry 20 returns to Step S1 and repeats the above steps.

The foregoing has described the monitoring system 100. However, the configuration of the monitoring system 100 is not limited to the above. For example, the above embodiment describes a case where the measured value acquired by the processing circuitry 20 is the strain. However, the processing circuitry 20 may acquire, for example, temperature instead of or in addition to the strain. For example, the fatigue accumulation state of the structural body 101 by thermal stress can be recognized based on data of the temperature change of the structural body 101. Moreover, by acquiring the temperature change information of each measurement point of the structural body 101 in a short cycle, whether or not the structural body 101 has been struck by lightning can be recognized, and the position which has been struck by lightning can be estimated. In the modified example described herein, when the monitoring system is independently used, the reduction in the total amount of preserved data by the above-described cases achieves a suitable effect.

Figure 6:
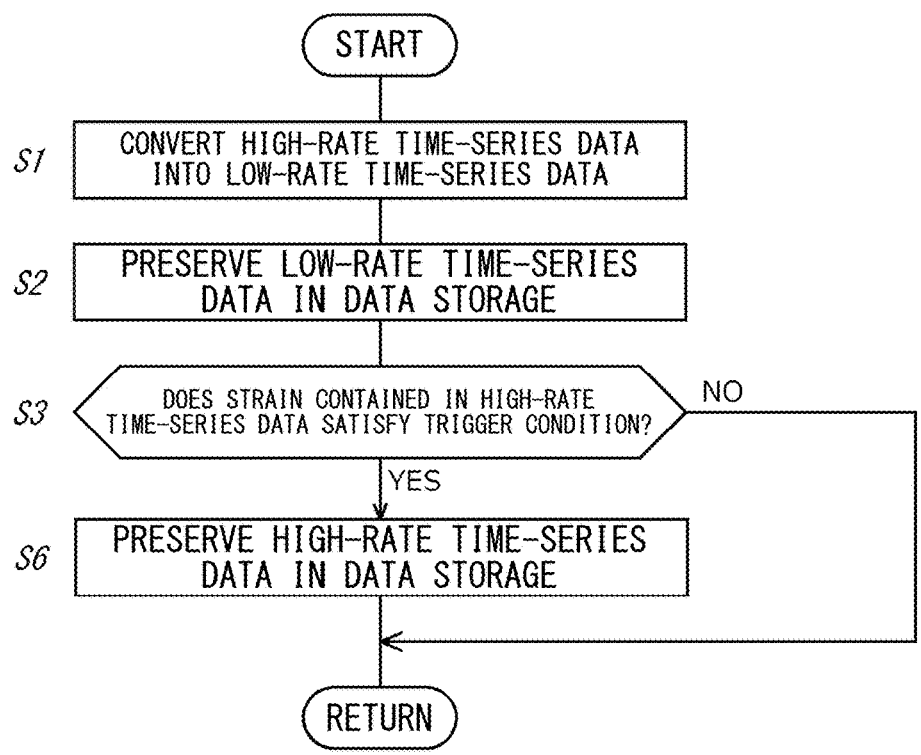
FIG. 6 is a flowchart of the data conversion processing according to a modified example.

Moreover, the order of various steps described above and shown in FIG. 2 may be suitably changed as long as the intended results of the present disclosure are not lost. One example may be such that: in the data acquisition processing and the data conversion processing, the low-rate time-series data and the high-rate time-series data are preserved in the data storage 30; and in third processing performed in parallel with the data acquisition processing and the data conversion processing, the impact position information and the damage range information are calculated by using the high-rate time-series data preserved in the data storage 30. To be specific, Steps S4 and S5 in FIG. 2 may be performed after or in parallel with the other steps, and Steps S4 and S5 may be omitted from the data conversion processing. In this case, the data conversion processing is performed as shown in FIG. 6.

In addition, in the monitoring system 100 described above, all of the high-rate time-series data, the low-rate time-series data, the impact position information, and the damage range information are preserved in the data storage 30. However, target information to be preserved may be suitably selected depending on the situation of the monitoring system. The present disclosure is characterized by including both temporarily storing the signal output from the measurer 10 and finally preserving the signal output from the measurer 10. The present disclosure is applicable regardless of the type of the information finally preserved. For example, the monitoring system according to the present disclosure may finally preserve only the low-rate time-series data and the high-rate time-series data or may finally preserve only the low-rate time-series data and the impact position information. The finally preserved information is selected depending on the situation of the monitoring system or the situation of the structural body to which the monitoring system is applied, and with this, the further optimized design and construction of the monitoring system can be realized.

Moreover, the present embodiment describes a case where the number of measurement points is plural. However, the number of measurement points may be one.

Conclusion

As described above, a monitoring system according to the present embodiment includes: a sensor to measure physical quantities at one or a plurality of measurement points of a structural body; processing circuitry configured to acquire measured values from the sensor; a memory to store the measured values acquired from the sensor; and a data storage that, when one or some of the measured values stored in the memory satisfy a predetermined trigger condition, and as a result, it is determined that the structural body has received impact, records a group of data of the measured values which are within a certain time range and include the measured value based on which it is determined that the trigger condition is satisfied.

According to this configuration, the data preserved in the data storage that is a destination in which the data is finally preserved is a group of data which: includes a certain measured value that satisfies the trigger condition; and is within a limited period of time before and after the certain measured value. Data chronologically acquired during the entire operation time of the structural body is not recorded, but at a timing at which the occurrence of the impact at the structural body is detected by the trigger condition, only data which is within a certain period of time and includes the data that satisfies the trigger condition is recorded. With this, while securing an impact event determination of the structural body and its information, the amount of data of the measured values accumulated in the data storage can be suppressed.

Moreover, in the monitoring system according to the present embodiment, the processing circuitry acquires the measured values in a first sampling cycle from the sensor. The processing circuitry converts the measured values into time-series data whose sampling cycle is a second sampling cycle longer than the first sampling cycle. The processing circuitry records the time-series data in the data storage as a history of load applied to the structural body.

As above, the low-rate time-series data of the acquired measured values is preserved as the load history, and with this, various states, such as the fatigue accumulation state of the structural body, can be recognized. In addition, since the preserved data is the time-series data of a long cycle, the amount of data of the measured values accumulated in the data storage can be suppressed.

Moreover, in the monitoring system according to the present embodiment, the sensor includes a temperature sensor. The processing circuitry acquires the measured values in the first sampling cycle from the temperature sensor. The processing circuitry converts the measured values into time-series data whose sampling cycle is the second sampling cycle. The processing circuitry records the time-series data in the data storage as a history of temperature applied to the structural body.

As above, when the fatigue accumulation state of the structural body which has been obtained by the load history is corrected by using the temperature history, the fatigue accumulation state can be recognized more accurately.

Moreover, in the monitoring system according to the present embodiment, when one or some of the acquired measured values exceed a preset upper limit threshold or fall below a preset lower limit threshold, the processing circuitry determines that the trigger condition is satisfied.

As above, by using the upper limit threshold and the lower limit threshold, whether or not the acquired measured value satisfies the trigger condition can be clearly determined.

Moreover, in the monitoring system according to the present embodiment, the upper limit threshold and the lower limit threshold are based on the measured value that is acquired a predetermined period of time before a time point at which the measured value as a determination target is acquired.

As above, by setting the upper limit threshold and the lower limit threshold, in the determination regarding whether or not the acquired measured value satisfies the trigger condition, the zero point can be corrected in the steady operation, and the accurate determination can be performed.

Moreover, in the monitoring system according to the present embodiment, the sensor measures strains at the measurement points of the structural body. When the processing circuitry determines that one or some of the acquired strains satisfy a predetermined trigger condition, the processing circuitry estimates a position of a portion of the structural body which has received the impact, based on differences of time changes of the strains at the measurement points.

As above, by estimating the position of the portion of the structural body which has received the impact, the position can be specially inspected, and with this, whether or not the structural body is damaged can be recognized.

Moreover, in the monitoring system according to the present embodiment, the sensor measures strains at the measurement points of the structural body. When the processing circuitry determines that one or some of the acquired strains satisfy a predetermined trigger condition, the processing circuitry performs a Fourier transform of a waveform of a time change of the acquired strains. Based on an integrated value of frequency response which is obtained by the Fourier transform, the processing circuitry estimates a range and magnitude of damage caused by the impact applied to the structural body.

As above, by estimating the range and magnitude of the damage caused by the impact applied to the structural body, the presence or absence of the necessity of a special inspection for the damage of the structural body can be determined, and as a result, the execution frequency of the special inspection can be lowered.

Moreover, as described above, the monitoring system according to the present disclosure is applicable to various structural bodies. Especially, the monitoring system according to the present disclosure is suitably applicable to a movable body, such as an aircraft, which is an independent structure and is relatively difficult to transmit or receive information to or from an outside during operation.

According to an embodiment, a display such as a flat panel display, an LCD display, an LED, an OLED display, or any desired type of display to display any of the information disclosed herein to a user is connected to the processing circuitry 20. Further, there is an alarm indicator connected to the processing circuitry 20 which includes an audio and/or visual alarm generator such as a siren, buzzer, or other audio warning and/or flashing light, strobe, or other display to generate a visual warning. According to an embodiment, a message is provided to a person or a machine that an inspection of a part and/or replacement of a part needs to be performed. In response the message, an inspection and/or replacement is performed of any part that is or may be damaged. The replacement may be performed after there is an inspection, based on a result of the inspection.

The inspection and/or replacement may be performed by an automated device such as robot connected directly or indirectly to the processing circuitry 20, manually, or a combination of the automated device and manually, each of which is considered an inspector.

From the foregoing explanation, many modifications and other embodiments of the present disclosure are obvious to one skilled in the art. Therefore, the foregoing explanation should be interpreted only as an example and is provided for the purpose of teaching the best mode for carrying out the present disclosure to one skilled in the art. The structures and/or functional details may be substantially modified within the scope of the present disclosure.

What is claimed is:

1. A monitoring system comprising:
a sensor to measure physical quantities at one or a plurality of measurement points of a structural body;
processing circuitry configured to obtain measured values from the sensor;
a memory to store the measured values that were acquired from the sensor;
a data storage that, when one or some of the measured values stored in the memory satisfy a trigger condition that is predetermined, and as a result, it is determined that the structural body has received an impact, records a group of data of the measured values which are within a certain time range and include a measured value based on which it is determined that the trigger condition is satisfied;
the processing circuitry is configured to set an upper limit threshold and a lower limit threshold based on the measured value in which the upper limit threshold and the lower limit threshold are both shifted by a same later fixed amount of time from a time of the measured value; and
the processing circuitry is configured to determine that the trigger condition is satisfied when the measured value exceeds the upper limit threshold or falls below the lower limit threshold.

2. The monitoring system according to claim 1, wherein:
the processing circuitry acquires the measured values in a first sampling time segment from the sensor;
the processing circuitry converts the measured values into time-series data having a lower sampling time segment by partially eliminating data from the measured values in the first sampling time segment; and
the processing circuitry records the time-series data in the data storage as a history of load applied to the structural body.

3. The monitoring system according to claim 2, wherein:
the sensor includes a temperature sensor;
the processing circuitry acquires the measured values in the first sampling time segment from the temperature sensor;
the processing circuitry converts the measured values into time-series data whose sampling time segment is the second sampling time segment; and
the processing circuitry records the time-series data in the data storage as a history of temperature applied to the structural body.

4. The monitoring system according to claim 1, wherein:
the sensor measures strains at the measurement points of the structural body; and
when the processing circuitry determines that one or some of the strains satisfy a trigger condition that is predetermined, the processing circuitry estimates a position of a portion of the structural body which has received the impact, based on differences of time changes of the strains at the measurement points.

5. The monitoring system according to claim 1, wherein:
the sensor measures strains at the measurement points of the structural body;
when the processing circuitry determines that one or some of the strains satisfy a trigger condition that is predetermined, the processing circuitry performs a Fourier transform of a waveform of a time change of the strains; and
based on an integrated value of frequency response which is obtained by the Fourier transform, the processing circuitry estimates a range and magnitude of damage caused by the impact applied to the structural body.

6. An aircraft comprising the monitoring system according to claim 1.

7. The monitoring system according to claim 1, further comprising:
a display to display a message to perform an inspection when the trigger condition is satisfied.

8. The monitoring system according to claim 1, further comprising:
an inspector to inspect the structural body when the trigger condition is satisfied.

9. A method of monitoring, comprising:
measuring physical quantities at one or a plurality of measurement points of a structural body;
acquiring the physical quantities as measured values that are time-series data of a predetermined sampling time segment;
temporarily holding the measured values;
determining that the structural body has received an impact and recording a group of data of the measured values which are within a certain time range and include a measured value based on which it is determined that a trigger condition is satisfied, when one or some of the temporarily held measured values satisfy the trigger condition;
setting an upper limit threshold and a lower limit threshold based on the measured value in which the upper limit threshold and the lower limit threshold are both shifted by a same later fixed amount of time from a time of the measured value; and
determining that the trigger condition is satisfied when the measured value exceeds the upper limit threshold or falls below the lower limit threshold.

10. The method according to claim 9, wherein:
the measured values are acquired in a first sampling time segment from a sensor,
the method further comprising:
converting the measured values into time-series data having a lower sampling time segment by partially eliminating data from the measured values in the first sampling time segment; and
recording the time-series data as a history of load applied to the structural body.

11. The method according to claim 10, wherein:
the sensor includes a temperature sensor,
the acquiring includes acquiring the measured values in the first sampling time segment from the temperature sensor;
the converting includes converting the measured values into time-series data whose sampling time segment is the second sampling time segment; and
the recording includes recording the time-series data as a history of temperature applied to the structural body.

12. The method according to claim 9, wherein:
the measuring includes measuring strains at the measurement points of the structural body; and
when it is determined that one or some of the strains satisfy a trigger condition that is predetermined, there is further performed estimating a position of a portion of the structural body which has received the impact, based on differences of time changes of the strains at the measurement points.

13. The method according to claim 9, wherein:
the measuring includes measuring strains at the measurement points of the structural body,
the method further comprising:
when it is determined that one or some of the strains satisfy a trigger condition that is predetermined, performing a Fourier transform of a waveform of a time change of the strains; and
based on an integrated value of frequency response which is obtained by the Fourier transform, estimating a range and magnitude of damage caused by the impact applied to the structural body.

14. The method according to claim 9, wherein:
the measuring measures the structural body which is an aircraft.

15. The method according to claim 9, further comprising:
a displaying a message to perform an inspection when the trigger condition is satisfied.

16. The method according to claim 9, further comprising:
inspecting the structural body when the trigger condition is satisfied.

* * * * *